US 7,747,969 B2

(12) United States Patent
Danninger (10) Patent No.: US 7,747,969 B2
(45) Date of Patent: Jun. 29, 2010

(54) METHOD AND SYSTEM FOR DISPLAYING DROP DOWN LIST BOXES

(75) Inventor: Michael Danninger, Landau (DE)

(73) Assignee: SAP AG, Walldorf (DE)

( * ) Notice: Subject to any disclaimer, the term of this patent is extended or adjusted under 35 U.S.C. 154(b) by 318 days.

(21) Appl. No.: 11/600,562

(22) Filed: Nov. 15, 2006

(65) Prior Publication Data

US 2008/0115085 A1    May 15, 2008

(51) Int. Cl.
    *G06F 3/00* (2006.01)
(52) U.S. Cl. .................. 715/843; 715/810; 715/764
(58) Field of Classification Search .......... 715/843, 715/810, 764
    See application file for complete search history.

(56) References Cited

U.S. PATENT DOCUMENTS 5,295,062 A * 3/1994 Fukushima .............. 700/83
2002/0167548 A1* 11/2002 Murray .................. 345/825
2006/0026147 A1* 2/2006 Cone et al. .............. 707/3
2007/0061746 A1* 3/2007 Folting et al. ........... 715/764

* cited by examiner

*Primary Examiner*—Kieu Vu
*Assistant Examiner*—Michael Roswell
(74) *Attorney, Agent, or Firm*—Kenyon & Kenyon LLP (57) ABSTRACT

A method and system for displaying a drop down list box. The method and system may include associating a history record with a drop down list box. The method and system may also include associating a filter box with the drop down list box. the method and system may also include associating a unique identifier with each choice in the drop down list box. The method and system may also include associating a hierarchical structure containing more detailed information about choices in the drop down list box with the drop down list box. Finally, the method and system may include displaying the choices in the drop down list box to a user as a function of at least one of the associated history record, filter box, unique identifier, or hierarchical structure.

41 Claims, 7 Drawing Sheets

| Region | Region Code | Sales Person | Product | Sales | Target | Variance |
|---|---|---|---|---|---|---|
| ▼ North | 0929831 | ▼ Richard Donohan | BMW X5 | 8 | 53,33% | -47% |
| | | | BMW Z3 | 12 | 80% | -20% |
| | | ▼ Patricia Grey | Audi A3 | 22 | 146,67% | 47% |
| | | | Audi A4 | 23 | 153,33% | 53% |
| | | | Audi A6 | 16 | 106,67% | 7% |
| ▼ South | 02392349 | ▼ Luke Burton | Mercedes-Benz CLK 320 | 10 | 66,67% | -33% |
| | | | Mercedes-Benz CLS 350 | 3 | 20% | -80% |
| | | ▶ Willard Rafter | Volvo S40 | 14 | 93,33% | -7% |

METHOD AND SYSTEM FOR DISPLAYING DROP DOWN LIST BOXES

FIELD OF THE INVENTION

The present invention relates to a software tool for displaying drop down list boxes ("DDLB"). Specifically, it associates the choices in a DDLB with relevant information, thereby making it easy for a user to navigate the DDLB.

BACKGROUND INFORMATION

Users often do not like complex value searches and instead prefer the ease of use of a DDLB. DDLBs are one of the most commonly used controls for data selection. They are easy to use and well received by end users. DDLBs typically allow a user to select a single value. However, depending on the amount and structure of possible entries, different selection modes may be necessary to best meet the user's requirements. Examples of common selection modes are hierarchical value structures or tree structures. These selection modes may be used, for example, to display positions in an organizational structure, skills in a skills catalog, or products in a product catalog. Currently, these selection modes require the user to switch screens to access them. Alternatively, they may appear in a modal pop-up window. In either case, the user's task flow is interrupted.

DDLBs are limited in function. For enhanced searching, more cumbersome mechanisms must be employed. DDLBs contain a single column and therefore only allow for simple value searches. A user may type a character and the value list may then position the cursor at the first hit of the character in the list. Each time the character is pressed on the keyboard, the cursor may be moved to the next choice in the DDLB which begins with that character. In contrast, extended value searches usually appear in a modal pop-up with a two column (key/value) table and a filter row. The user selects a table entry in a certain row and thereby applies the selected entry to the input field. Once again, the modal pop-up window interrupts the user's work flow.

DETAILED DESCRIPTION

Embodiments of the present invention work cooperatively with existing software applications to display DDLBs. A DDLB may be associated with a history record in which the last choices in the DDLB selected by the user are stored. For example, in a DDLB pertaining to sales people, the last sales people selected by the user may appear on top of the rest of the choices in the DDLB.

A DDLB may also have a filter box associated with it. A user may enter one or more characters to limit the selections displayed to him. Several special characters may also be designated which take the place of other letters. For example, the symbol "*" may stand for any string of characters, single or multiple. The "*" may be used in the beginning, in the middle or at the end of a term. It may also be used multiple times in a term. The term "Ad*" may therefore match any of the following entries: Administration, Address, Additional Payment, etc. As another example, the symbol "+" may also be used at the beginning, in the middle or at the end of a term. The "+" may also be used multiple times in a term. The "+" may stand for exactly one character. The term "Me+er" may therefore match any of the following entries: Meier, Meyer, Meler, etc. In addition, the term "M+++er" may match any of the following entries: Miller, Mister, Master, etc.

Also, a DDLB may contain choices which are each associated with a unique identifier. The unique identifiers may appear alongside the choices in the drop down list box as an adjacent column. There may be a filter box associated with the unique identifiers, and a user may be able to enter one or more characters in the filter box to limit the choices display to him. For example, the term "02*" may be entered by the user in the filter box pertaining to the unique identifiers. The term "02*" may match any of the following entries: 020, 0212, 02999, etc.

A DDLB may contain multiple columns, and there may be a filter box associated with one or more columns in the DDLB. For example, a DDLB pertaining to human resources may contain the following columns: name, address, birthday, start date. There may be a filter box associated with one or more of the following columns: name, address, birthday, start date.

Additionally, a DDLB may be associated with a hierarchical structure, such as a tree structure or a table. When the user selects the DDLB, the hierarchical structure may be displayed. For example, the purpose of the DDLB may be for a user to select a sales person. Then, when the user selects the DDLB, a table may be presented containing detailed information about each sales person. This may enable the user to review detailed information about each sales person while navigating through a DDLB rather than a modal pop-up window.

Figure 1:
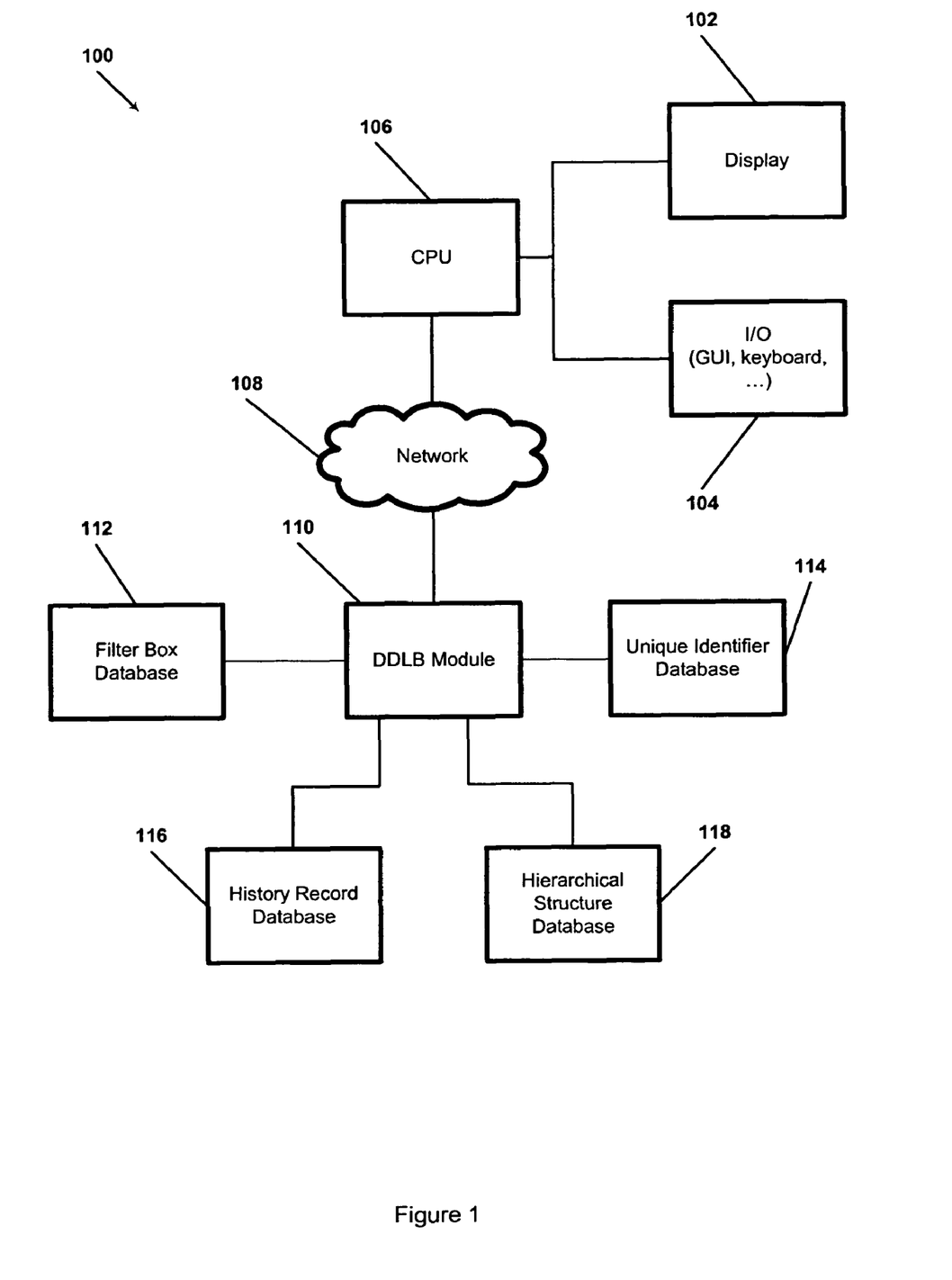
FIG. 1 is a simplified block diagram of a computer system according to an embodiment of the present invention.
Figure 2:
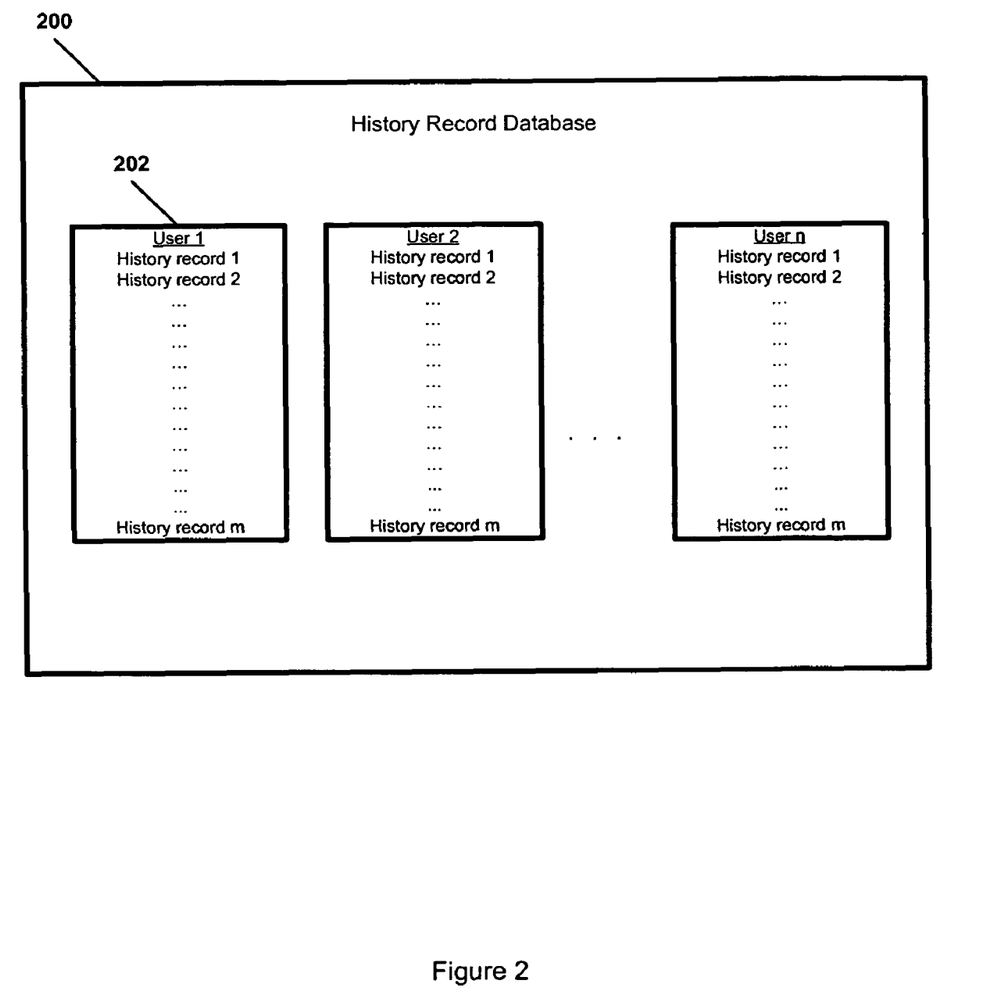
FIGS. 2-3 illustrate an example History Record Database and an example individual history record, as referenced in FIG. 1.
Figure 3:
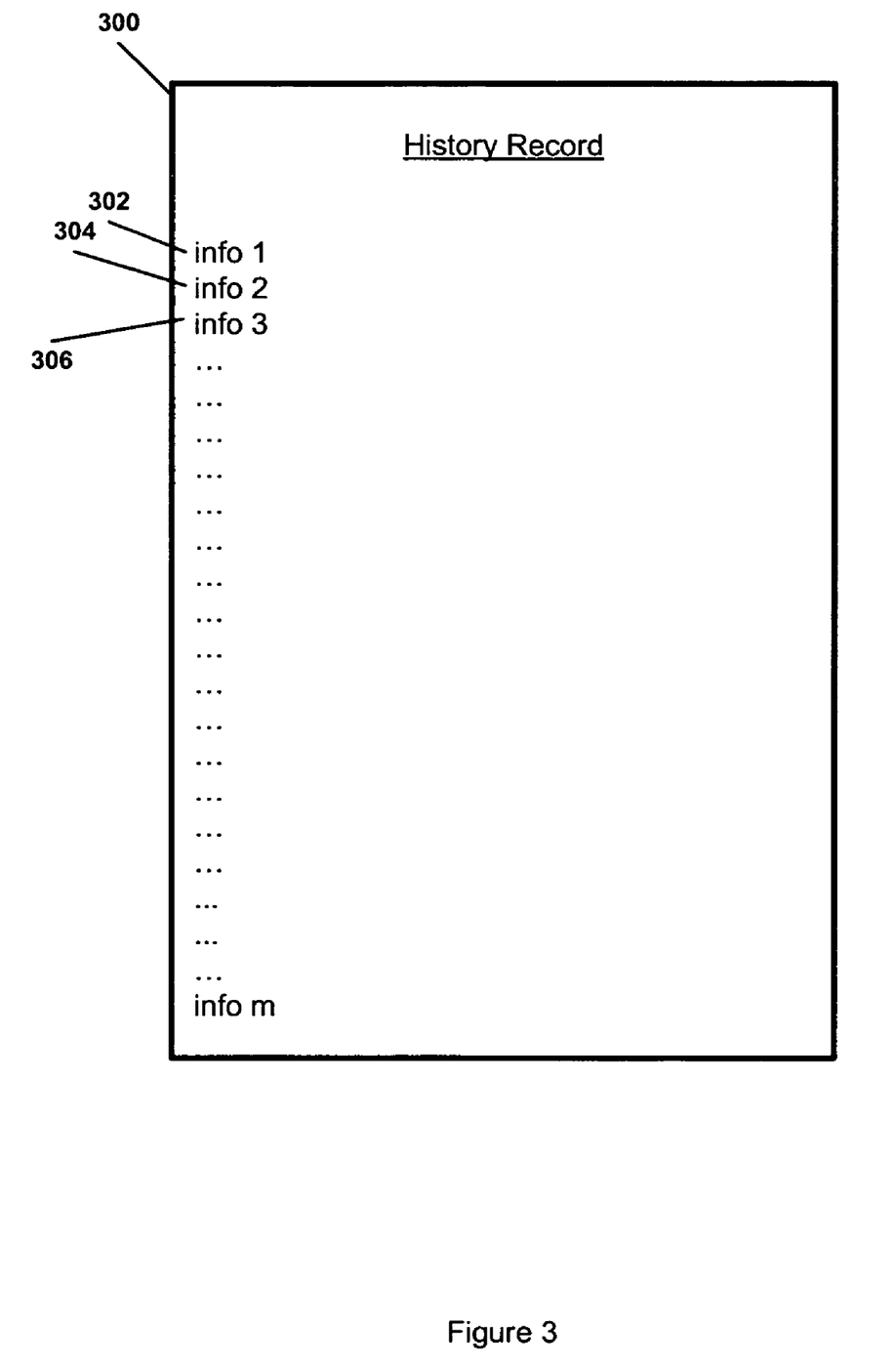

FIG. 1 is a simplified block diagram of an exemplary computer system 100 suitable for use with the present invention. The CPU 106 may associate a history record with a specific user and a specific DDLB. This association may be stored in the History Record Database 116. An exemplary History Record Database 116 and individual history records are illustrated in FIGS. 2-3. The CPU 106 may associate a filter box with a specific DDLB. A filter box enables a user to narrow down the choices displayed in the DDLB by typing one or more characters. Specific instances of filter box filters are discussed above. This association may be stored in the Filter Box Database 112. The CPU 106 may associate a unique identifier with each choice in a specific DDLB. The unique identifier may be a string of characters and may contain both letters and numbers. This association may be stored in the Unique Identifier Database 114. The CPU 106 may associate a hierarchical structure containing more detailed information about choices in the DDLB with a specific DDLB. The hierarchical structure may be, for example, a tree structure or a table. This association may be stored in the Hierarchical Structure Database 118.

A user may select a DDLB via input/output device 104, such as a keyboard or a mouse, for example. The CPU 106 may access the DDLB Module 110 via the network 108. The CPU 106 may send a reference to the presently selected DDLB and a reference to the present user to the DDLB Module 110 via the network 108. The user may be uniquely identified during a log-in procedure. The DDLB Module 110 may search the History Record Database 116, the Filter Box Database 112, the Unique Identifier Database 114, and the Hierarchical Structure Database 118 to determine whether any of the above databases contain one or more associations to the presently selected DDLB. For example, the History Record Database may contain a history record associated with the present user and the present DDLB. As another example, the Filter Box Database may contain a filter box associated with the present DDLB. If none of the databases contain an association to the presently selected DDLB, the DDLB Module 110 may send this information back to the CPU 106 via the network 108. The CPU 106 then may present the DDLB to the user without any enhancements via the display 102. In this instance, the DDLB may be presented in a simple list format. If one or more of the databases contains an association to the presently selected DDLB, the DDLB Module 110 may retrieve the association information from the one or more databases and send it back to the CPU 106 via the network 108. For example, the Unique Identifier Database 114 may contain an association to the present DDLB. The unique identifiers associated with the choices in the DDLB may be retrieved and returned to the CPU 106 via the network 108. As another example, there may be a hierarchical structure, such as a table, associated with the present DDLB. The hierarchical structure associated with the DDLB may be retrieved and returned to the CPU 106 via the network 108. After the association information is sent back to the CPU 106, the CPU 106 may present the DDLB to the user via the display 102 with the extra information derived from the one or more databases.

Once the user selects a choice from a DDLB, the CPU 106 may send a reference to the selection via the network 108 to the DDLB Module 110. The DDLB Module 110 may access the History Record Database 116. The DDLB Module 110 may locate the records pertaining to the current user, and may locate the record pertaining to the presently selected DDLB. The DDLB Module 110 then may store the current selection in the history record pertaining to the current user and to the presently selected DDLB in the History Record Database 116.

FIGS. 2-3 illustrate an example History Record Database and an example individual history record, as referenced in FIG. 1. The History Record Database 200 may consist of a set of history records 202 for each user. A user may be uniquely identified when he logs onto the system. Each user may have a separate history record 300 for each DDLB. Each history record, in turn, may store information about the entries in the DDLB previously chosen by the user. This information may be stored as info 1 302, info 2 304, etc. For example, a DDLB to select a color may contain the following choices: black, blue, brown, green, orange, purple, pink, red, yellow. A user may select "orange" the first time he accesses the DDLB. The history record associated with that specific user and that specific DDLB may store "orange" as the first entry in info 1 302. When the user next accesses the DDLB, "orange" may appear as the history associated with that DDLB. The history may be presented above the choices of the DDLB. The history may be separated from the choices of the DDLB by a bold line, for example. A user may select "brown" the next time he accesses the DDLB. The history record associated with that specific user and that specific DDLB may store "brown" as the second entry in info 2 304. When the user next accesses the DDLB, "orange" and "brown" may appear as the history associated with that DDLB. A user may select "green" the next time he accesses the DDLB. The history record associated with that specific user and that specific DDLB may store "green" as the third entry in info 3 306. When the user next accesses the DDLB, "orange," "brown" and "green" may appear as the history associated with that DDLB.

Figure 4:
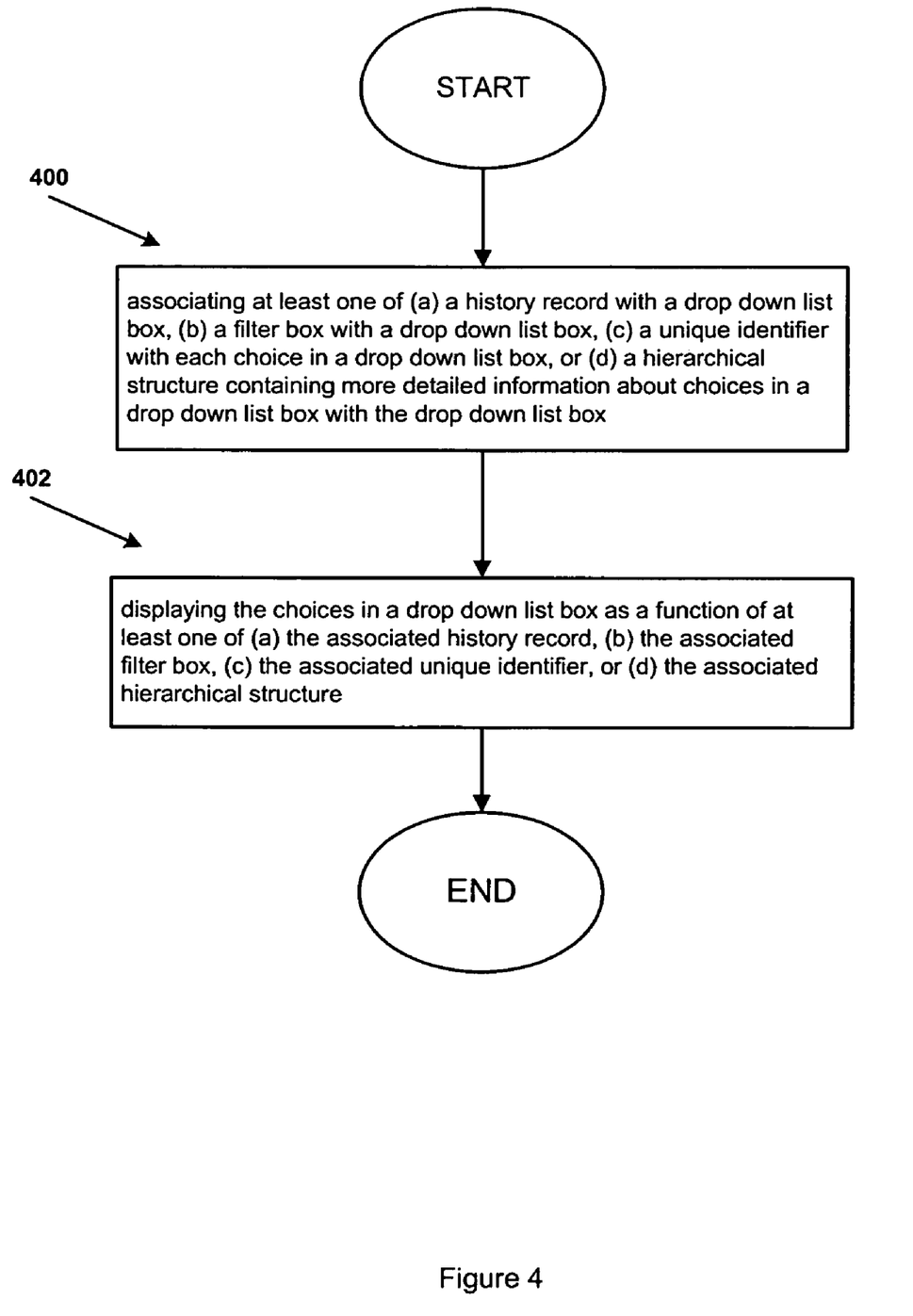
FIG. 4 is a dataflow diagram illustrating operation of one embodiment of the present invention.

FIG. 4 is a dataflow diagram of one embodiment of the present invention. In 400, the drop down list box may be associated with at least one of (a) a history record, (b) a filter box, (c) a unique identifier, or (d) a hierarchical structure containing more detailed information about choices in the drop down list box. The history record may contain a separate set of records for each individual user. Each set of records may, in turn, contain a separate history record associated with each DDLB. The filter box may allow a user to type in one of more characters to narrow down the number of choices displayed in the DDLB. There may be a unique identifier associated with each choice in the drop down list box. Each unique identifier may contain characters, including numbers and/or letters. The hierarchical structure may be a tree or a table. In 402, the choices in the DDLB may be displayed as a function of at least one of (a) the associated history, (b) the associated filter box, (c) the associated unique identifier, or (d) the associated hierarchical structure. For example, if there is a history record associated with the present user and the present DDLB, the last several choices selected by the user in the present DDLB may be presented above the rest of the choices in the DDLB. The choices reflected in the history and the other DDLB choices may be separated by a bold line. As another example, if a hierarchical tree is associated with the DDLB, the hierarchical tree may be presented to the user in place of the DDLB choices. The hierarchical tree may contain all the choices that were present in the DDLB along with additional information about the choices in the DDLB.

Figure 5:
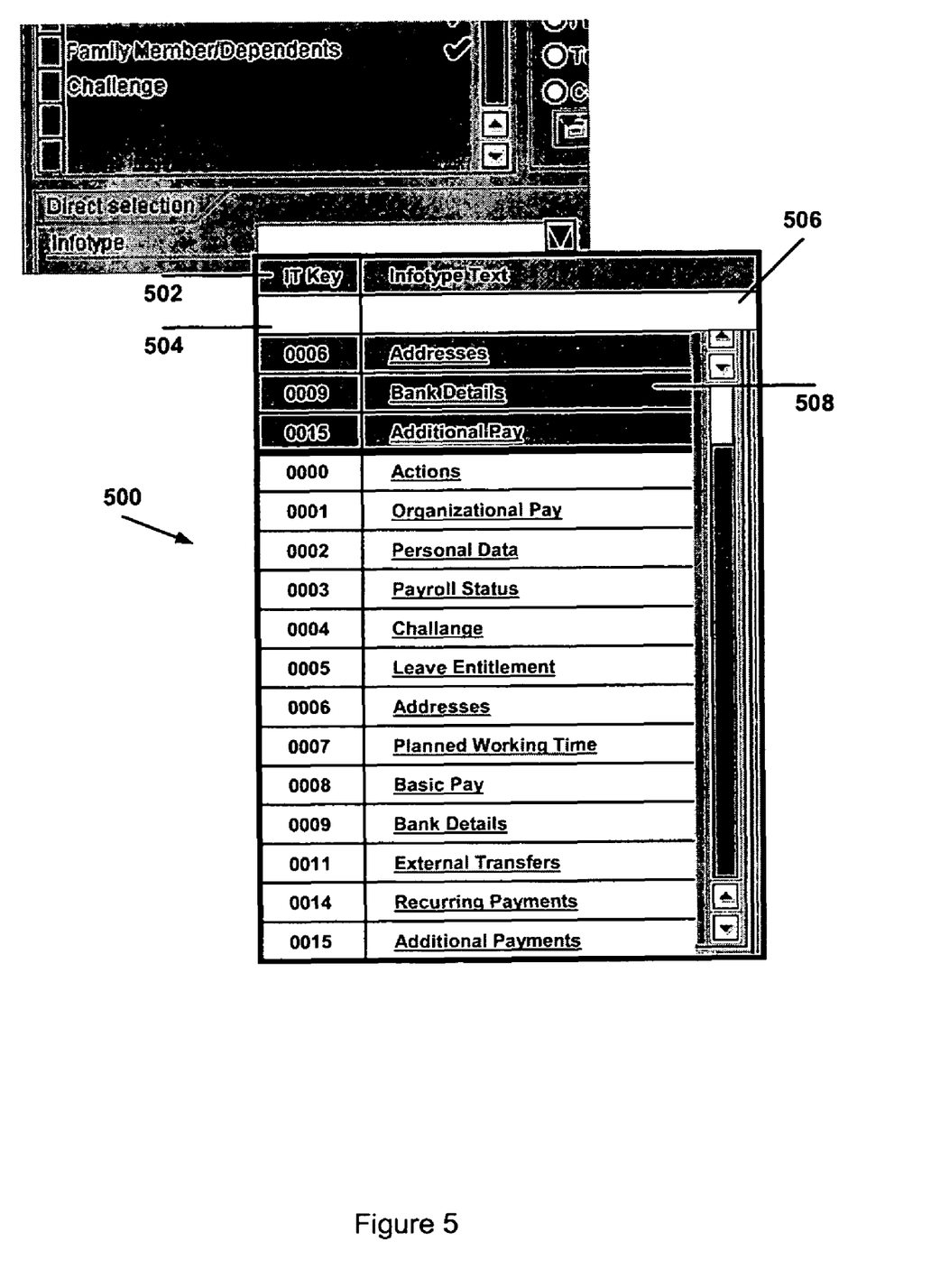
FIGS. 5-7 are example embodiments of the present invention.

FIG. 5 is an example embodiment of the present invention. This embodiment of the present invention 500 incorporates several features. Each choice in the DDLB is associated with a unique identifier, the "IT Key" 502. There is also history 508 associated with the DDLB. The three choices in the shaded boxes at the top of the DDLB reflect the last three choices made by the user in this DDLB. There are two filter boxes at the top of the DDLB. In the filter box below the "IT Key" 504, a user may type one or more characters and narrow down the choices displayed in the DDLB by the IT Key. For example, a user may type "001" in this box and the DDLB would only contain the choices corresponding to IT Keys 0011, 0014 and 0015. In the filter box below the "Infotype Text" 506, a user may type one or more characters and narrow down the choices displayed in the DDLB by the Infotype Text. For example, a user may type the letter "P" in this box and the DDLB would only contain the choices beginning with the letter P, i.e. Personal Data, Payroll Status, and Planned Working Time.

Figure 6:
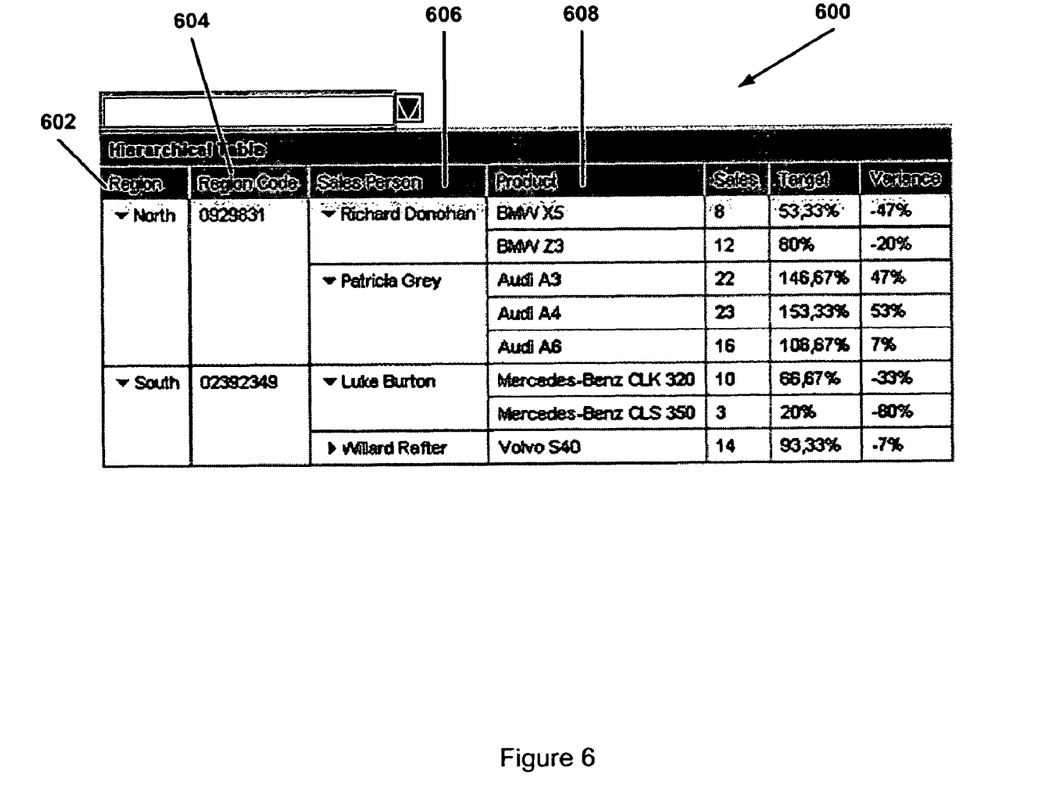

FIG. 6 is another example embodiment of the present invention. This embodiment of the present invention 600 incorporates a hierarchical structure, i.e. a tree, with the DDLB. This hierarchical tree may be presented in place of a DDLB to enable the user to choose any of the following: a region 602, region code 604, sales person 606, product 608, etc. The hierarchical tree provides additional information about the region 602, region code 604, sales person 606 and product 608 categories. A user may choose his selection from the tree by clicking on the appropriate box.

Figure 7:
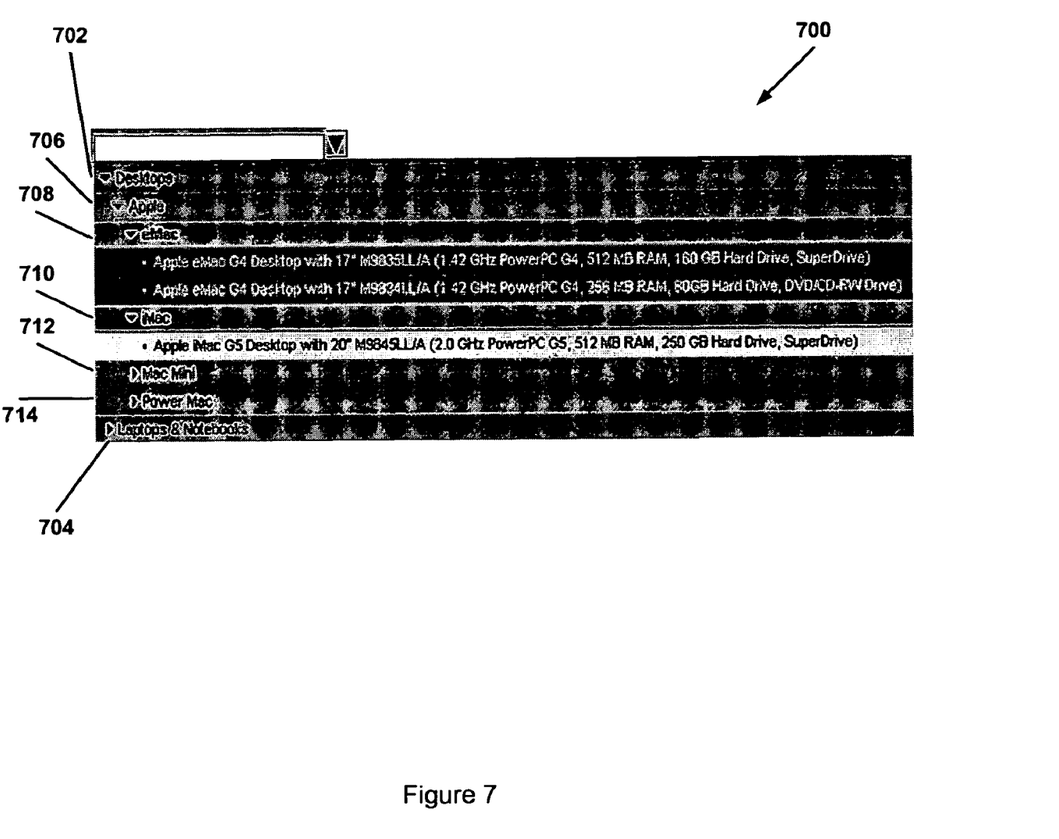

FIG. 7 is another example embodiment of the present invention. This embodiment of the present invention 700 incorporates a hierarchical structure, i.e. a table, with the DDLB. This DDLB is used to choose a computer model number. The table provides additional information about the computers rather than just the computer model number. For example, the table is divided into desktops 702 and laptops 704. The type of desktop listed is Apple 706. The type of Apple desktops listed are eMac 708, iMac 710, Mac Mini 712 and Power Mac 714. The two types of Apple eMacs listed are Apple eMac G4Desktop with 17" M9835LL/A (1.42 GHz PowerPC G4, 512 MB RAM, 160 GB Hard Drive, Super-Drive) and Apple eMac G4Desktop with 17" M9835LL/A (1.42 GHz PowerPC G4, 256 MB RAM, 80 GB Hard Drive, DVD/CD-RW Drive). A user may choose a computer model number from the table by clicking on the appropriate row.

What is claimed is:

1. A method of automatically customizing presentation of a drop down list box to a user based on the user's data in a storage, wherein the drop down list box selectively displays therein visual components respectively corresponding to a drop down list, a filter box, identifiers, and hierarchical structures based on data representing associations with corresponding databases, comprising:

responsive to a single user activation of an icon representing the drop down list box, performing steps (a)-(e) to display the drop down list box:

(a) (i) searching a user's history record for data that represents an association with the drop down list box and that includes an identification of data previously selected by the user from a display of the drop down list in the drop down list box, and (ii) if the data representing the association with the drop down list is found, displaying a modified version of the drop down list that is modified in accordance with the user's history record, (b) (i) searching a filter box database for data that represents an association of the filter box with the drop down list box, and (ii) if the data that represents the association of the filter box with the drop down list box is found, displaying the filter box in the drop down list box, (c) (i) searching an identifier database for data that represents an association of unique identifiers with each choice in the drop down list box, and (ii) if the data that represents the association of unique identifiers with the drop down list box is found, displaying the identifiers in the drop down list box, and (d) (i) searching a hierarchical structure database for data that represents an association of the hierarchical structure with the drop down list box, the hierarchical structure containing more detailed information about choices in the drop down list, and (ii) if the data that presents the association of the hierarchical structure with the drop down list box is found, displaying the hierarchical structure in the drop down list box;

(e) if there is no data representing any of the visual components with the drop down list box, displaying the drop down list.

2. The method of claim 1, wherein the history record is associated with the drop down list box, and the choices in the drop down list box are displayed as a function of the associated history record.

3. The method of claim 1, wherein the filter box is associated with the drop down list box, and the choices in the drop down list box are displayed as a function of the associated filter box.

4. The method of claim 1, wherein a unique identifier is associated with each choice in the drop down list box, and the choices in the drop down list box are displayed as a function of the associated unique identifiers.

5. The method of claim 1, wherein the hierarchical structure is associated with the drop down list box, and the choices in the drop down list box are displayed as a function of the associated hierarchical structure.

6. The method of claim 1, wherein the history record is determined based on the last entries chosen by a user in the drop down list box.

7. The method of claim 1, wherein the filter box is associated with the choices in the drop down list box.

8. The method of claim 1, wherein the filter box is associated with the unique identifiers associated with the choices in the drop down list box.

9. The method of claim 1, wherein:
the drop down list box contains a plurality of columns; and
a plurality of filter boxes are associated with the plurality of columns in the drop down list box.

10. The method of claim 1, wherein the filter box enables a user to limit the presented choices in the drop down list box by entering one or more characters in the filter box.

11. The method of claim 1, wherein the unique identifier is one or more characters which uniquely identifies a choice in the drop down list box.

12. The method of claim 1, wherein the hierarchical structure is a tree structure.

13. The method of claim 1, wherein the hierarchical structure is a table.

14. The method of claim 1, wherein the displaying is done after a user clicks on the drop down list box.

15. The method of claim 1, wherein the user's history record is stored in a history record database.

16. The method of claim 15, wherein:
the user's history record further includes a plurality of history records each of which is associated with a drop down list box; and
each of the plurality of history records further includes a list of items, an order of which determines an order of choices displayed in the drop down list.

17. The method of claim 16, further comprising:
responsive to the user selection of a choice in the drop down list, updating the users history record associated with the drop down list box.

18. The method of claim 1, further comprising:
entering one or more characters in the filter box displayed in the drop down list box;
actuating the filter box to cause a change in a display of the choices in the drop down list box based on the one or more characters entered in the filter box.

19. The method of claim 18, wherein the change is based on a matching between the entered one or more characters in the filter box and the choices.

20. The method of claim 19, wherein only choices matching the one or more characters are displayed in the drop down list box.

21. The method of claim 1, wherein the user is identified by a user login.

22. The method of claim 1, wherein the user's history record, the filter box database, the identifier database, and the hierarchical structure database are stored in a single database server.

23. The method of claim 1, wherein the user's history record, the filter box database, the identifier database, and the hierarchical structure database are each stored in a separate database server.

24. The method of claim 1, wherein the choices in the history record are displayed at a top portion of the drop down list.

25. The method of claim 24, wherein the choices in the history record are displayed in a chronological order.

26. The method of claim 25, wherein the choices in the history record are displayed such that the choices in the history record are separated from other choices by a bold line.

27. An article of manufacture comprising a computer readable medium storing instructions adapted to be executed by a processor, the instructions, when executed, defining a method of automatically customizing presentation of a drop down list box to a user based on the user's data in a storage, wherein the drop down list box selectively displays therein visual components respectively corresponding to a drop down list, a filter box, identifiers, and hierarchical structures based on data representing associations with corresponding databases, the method comprising:

responsive to a single user activation of an icon representing the drop down list box, performing steps (a)-(e) to display the drop down list box:

(a) (i) searching a user's history record for data that represents an association with the drop down list box and that includes an identification of data previously selected by the user from a display of the drop down list in the drop down list box, and (ii) if the data representing the association with the drop down list is found, displaying a modified version of the drop down list that is modified in accordance with the user's history record, (b) (i) searching a filter box database for data that represents an association of the filter box with the drop down list box, and (ii) if the data representing the association of the filter box with the drop down list box is found, displaying the filter box in the drop down list box, (c) (i) searching an identifier database for data that represents an association of unique identifiers with each choice in the drop down list box, and (ii) if the data representing the association of unique identifiers with the drop down list box is found, displaying the identifiers in the drop down list box, and (d) (i) searching a hierarchical structure database for data that represents an association of the hierarchical structure with the drop down list box, the hierarchical structure containing more detailed information about choices in the drop down list, and (ii) if the data presenting the association of the hierarchical structure with the drop down list box is found, displaying the hierarchical structure in the drop down list box;

(e) if there is no data representing any of the visual components with the drop down list box, displaying the drop down list.

28. The article of claim 27, wherein the history record is associated with the drop down list box, and the choices in the drop down list box are displayed as a function of the associated history record.

29. The article of claim 27, wherein the filter box is associated with the drop down list box, and the choices in the drop down list box are displayed as a function of the associated filter box.

30. The article of claim 27, wherein a unique identifier is associated with each choice in the drop down list box, and the choices in the drop down list box are displayed as a function of the associated unique identifier.

31. The article of claim 27, wherein the hierarchical structure is associated with the drop down list box, and the choices in the drop down list box are displayed as a function of the associated hierarchical structure.

32. The article of claim 27, wherein the history record is determined based on the last entries chosen by a user in the drop down list box.

33. The article of claim 27, wherein the filter box is associated with the choices in the drop down list box.

34. The article of claim 27, wherein the filter box is associated with the unique identifiers associated with the choices in the drop down list box.

35. The article of claim 27, wherein:
the drop down list box contains a plurality of columns; and
a plurality of filter boxes are associated with the plurality of columns in the drop down list box.

36. The article of claim 27, wherein the filter box enables a user to limit the presented choices in the drop down list box by entering one or more characters in the filter box.

37. The article of claim 27, wherein the unique identifier is one or more characters which uniquely identifies a choice in the drop down list box.

38. The article of claim 27, wherein the hierarchical structure is a tree structure.

39. The article of claim 27, wherein the hierarchical structure is a table.

40. The article of claim 27, wherein the displaying is done after a user clicks on the drop down list box.

41. A computer system for displaying a drop down list box, comprising:

a processor configured to perform a method of automatically customizing presentation of the drop down list box to a user based on the user's data in a storage, wherein the drop down list box selectively displays therein visual components respectively corresponding to a drop down list, a filter box, identifiers, and hierarchical structures based on data representing associations with corresponding databases, the method including:

responsive to a single user activation of an icon representing the drop down list box, performing steps (a)-(e) to display the drop down list box:

(a) (i) searching a user's history record for data that represents an association with the drop down list box and that includes an identification of data previously selected by the user from a display of the drop down list in the drop down list box, and (ii) if the data representing the association with the drop down list is found, displaying a modified version of the drop down list that is modified in accordance with the user's history record, (b) (i) searching a filter box database for data that represents an association of the filter box with the drop down list box, and (ii) if the data that represents the association of the filter box with the drop down list box is found, displaying the filter box in the drop down list box, (c) (i) searching an identifier database for data that represents an association of unique identifiers with each choice in the drop down list box, and (ii) if the data that represents the association of unique identifiers with the drop down list box is found, displaying the identifiers in the drop down list box, and (d) (i) searching a hierarchical structure database for data that represents an association of the hierarchical structure with the drop down list box, the hierarchical structure containing more detailed information about choices in the drop down list, and (ii) if the data that presents the association of the hierarchical structure with the drop down list box is found, displaying the hierarchical structure in the drop down list box;

(e) if there is no data representing any of the visual components with the drop down list box displaying the drop down list.

* * * * *